April 13, 1926.
J. L. MILTON
1,580,520
COMBINED IMPULSE COUPLING AND AUTOMATIC TIMING MECHANISM
Filed June 7, 1921 3 Sheets-Sheet 1
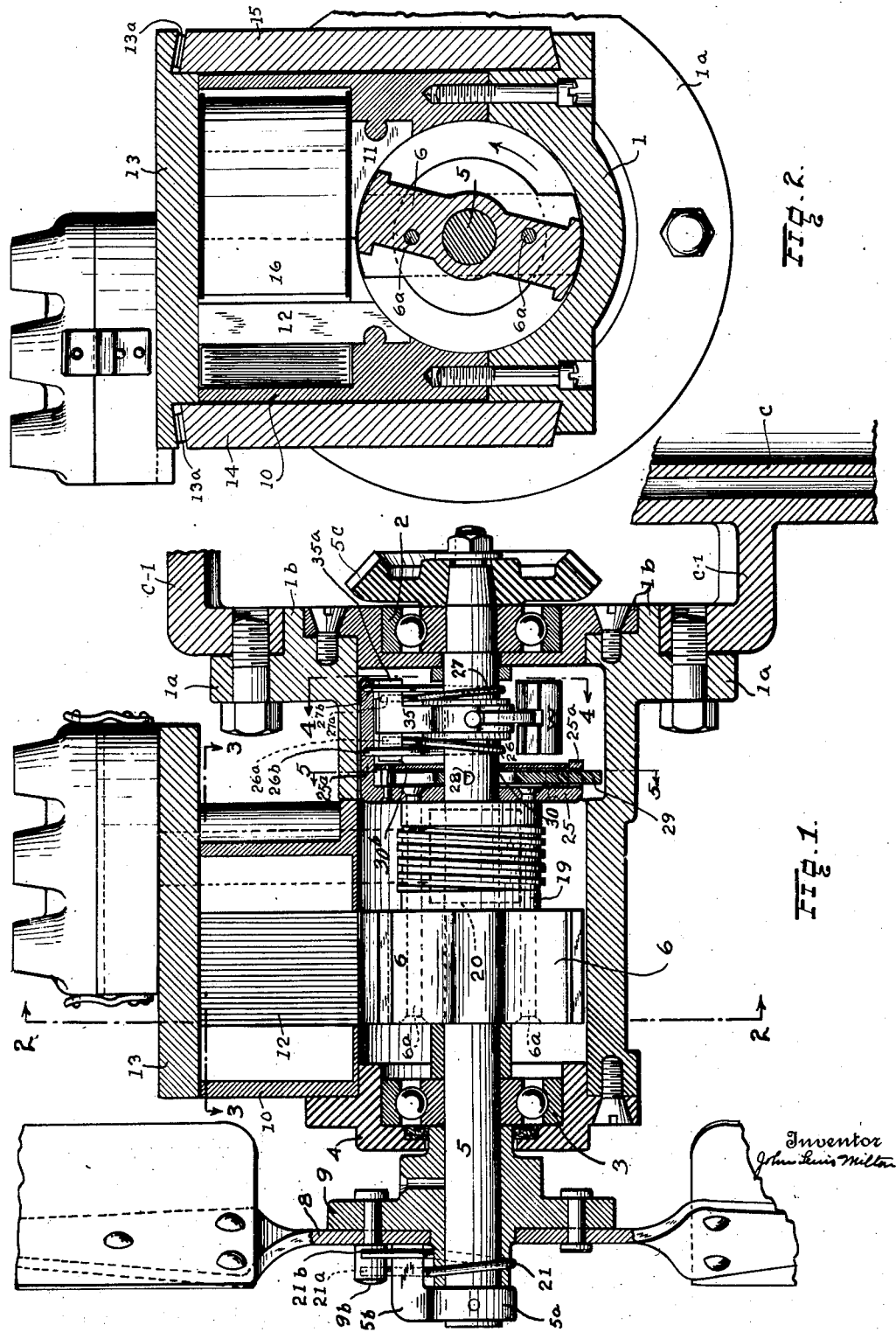

April 13, 1926.
J. L. MILTON
1,580,520
COMBINED IMPULSE COUPLING AND AUTOMATIC TIMING MECHANISM
Filed June 7, 1921  3 Sheets-Sheet 2
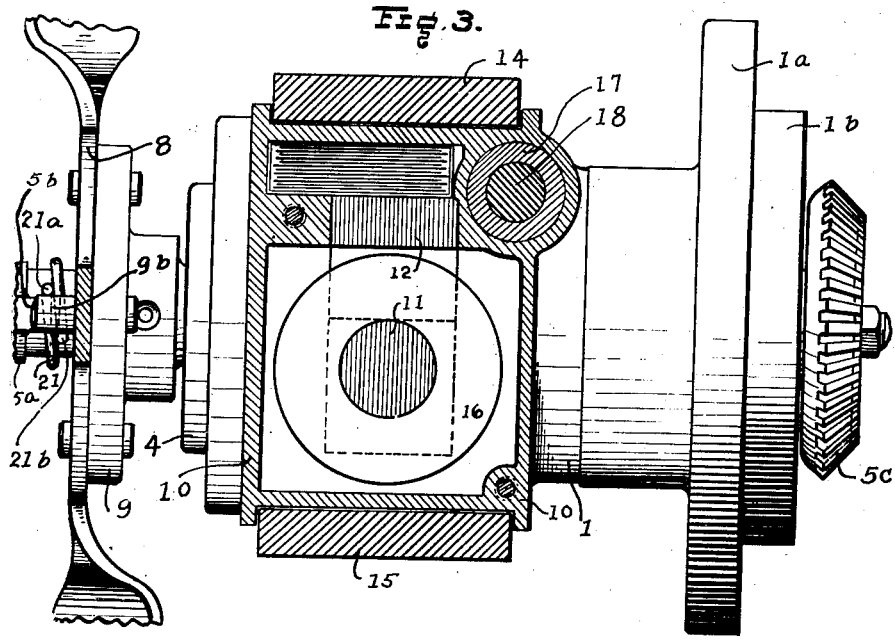
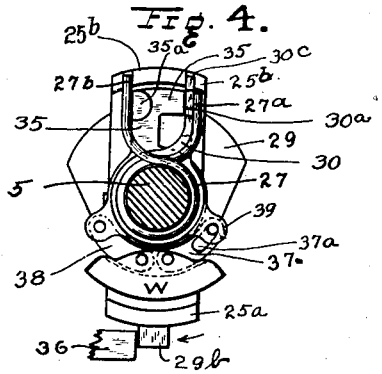
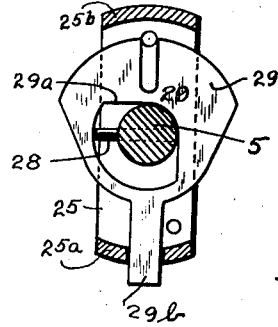
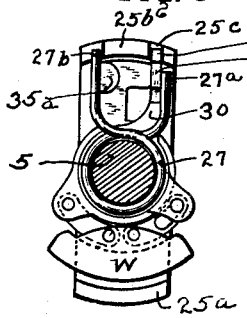
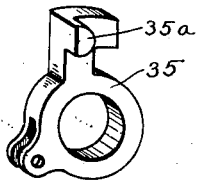
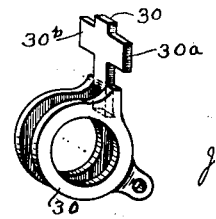
Inventor
John Lewis Milton April 13, 1926. 1,580,520
J. L. MILTON
COMBINED IMPULSE COUPLING AND AUTOMATIC TIMING MECHANISM
Filed June 7, 1921 3 Sheets-Sheet 3
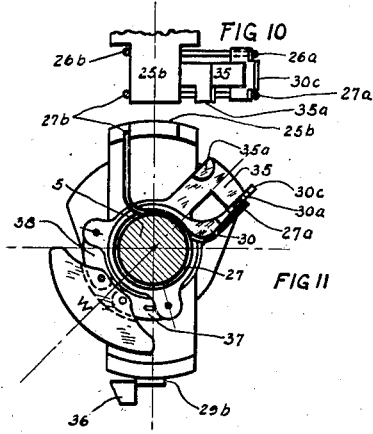
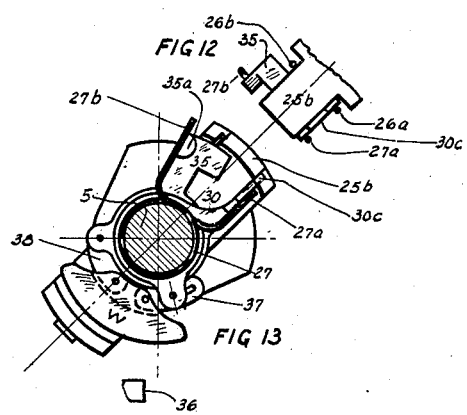
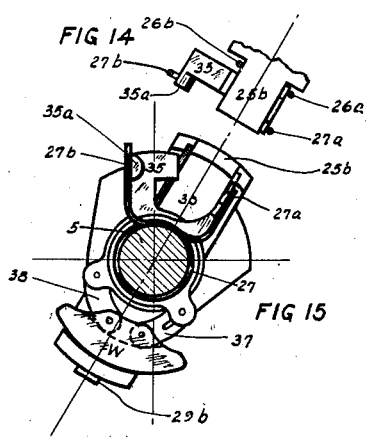
INVENTOR
John Lewis Milton Patented Apr. 13, 1926.

1,580,520

UNITED STATES PATENT OFFICE.

JOHN LEWIS MILTON, OF LOUISVILLE, KENTUCKY.

COMBINED IMPULSE COUPLING AND AUTOMATIC TIMING MECHANISM.

Application filed June 7, 1921. Serial No. 475,839.

*To all whom it may concern:*

Be it known that I, JOHN LEWIS MILTON, a citizen of the United States, residing in Louisville, in the county of Jefferson and State of Kentucky, have invented certain new and useful Improvements in a Combined Impulse Coupling and Automatic Timing Mechanism, of which the following is a specification, reference being had to the accompanying drawings.

This invention relates to automotive vehicles and has for its objects to construct into a single unit and to operate with a single drive a combined radiator cooling fan and a complete ignition device, equipped with an automatic impulse starter and automatic timing advance mechanism both of which can function independently of the main shaft which carries the fan blades, rotor et cetera.

I have sought to reduce the cost of production, increase the life and efficiency of the class of devices to which my invention relates.

For the purpose of illustration I have selected to illustrate the herein described cooling and ignition apparatus.

The general form and construction of the electric generator which I use in this application is of the well known inductor type.

Figure 1 is a transverse view of the device, partially in cross-section and partially in elevation. Fig. 2 is a cross-sectional view along line 2—2 of Fig. 1. Fig. 3 is a cross-sectional view along line 3—3 of Fig. 1. Fig. 4 is an end view of the impulse starter and automatic advance mechanism at rest or in starting position. Fig. 5 is an end view of the impulse starter mechanism along line 5—5 of Fig. 1 with cover plate. Fig. 6 is an end view of a modified structure of Fig. 4 showing the impulse starter feature eliminated. Fig. 7 is a detailed view of dog 35. Fig. 8 is a detailed view of arm 30. Fig. 9 is a detailed view of spring 13$^a$. Figs. 10, 11 show the impulser and advance mechanism of Fig. 4 rotated to a degree just prior to being tripped for impulsing action. Figs. 12, 13 show the same parts of Fig. 4 after being tripped as the recoil is taking place. Figs. 14, 15 show the same parts of Fig. 4 in running position and functioning as a timing device.

1 indicates a base of magnetic material formed with a mounting flange 1$^a$, which is bolted to a projection C$^1$ on the cylinder casting C. It will be understood that any other suitable support can be used. This base 1 forms one pole of the generator. The flange 1$^a$ is made at the drive end so as to carry a bearing support 1$^b$ for the ball bearing 2 and a final support for the entire device. At the other end of the generator another ball bearing 3 is mounted in an end plate 4. These two bearings carry shaft 5 on which are rotatively mounted a rotor 6 and spiral gear 19 also a radiator cooling fan 8 and its hub 9. On said shaft 5 is also mounted the combined impulse starter and automatic advance mechanism shown in detail in Figs. 4, 5, 6. Said shaft 5 is positively driven through a gear 5$^c$ or a sprocket at a fixed ratio to the engine's crank shaft.

10 indicates a housing structure of non-magnetic material such as a diecasting, into which are mounted pole pieces 11—12, preferably composed of laminæ. The whole structure is secured to the base 1 in any suitable manner so as to hold the poles in fixed relation as shown.

13 indicates a yoke of magnetic material connecting the like poles of the permanent magnets 14—15 which are beveled on ends to correspond with faces presented on pole 1 and yoke 13. The magnets are held in place by arched flat springs 13$^a$, 13$^a$. These arched springs are placed between the ends of magnets 14, 15 and top 13 when the latter is assembled, and they exert pressure so as to force the magnets to the positions as shown in Figs. 2 and 3. Pole 11 carries a compoundwound high tension coil 16 and pole 12 is an unwound one. Yoke 13 is so formed as to provide a distributor housing, thus eliminating machine work and extra parts. A bushing 17 fits into the housing 10 and provides a vertical shaft bearing for timer and distributor shaft 18 which is driven at a fixed ratio by gear 19 on shaft 5 and gear 20 on shaft 18. The details of the timer and distributor are not shown as they can be of conventional design.

The cooling fan 8 and hub 9 are driven from shaft 5 through dog 5$^a$ which is fixed to said shaft and torsion spring 21 the two ends, 21$^a$ and 21$^b$, of which engage the arm 5$^b$ of 5$^a$ and the pin 9$^b$. This feature is embodied to provide a flexible or cushioned drive to the fan. It will be noted that the fan's recoil will be absorbed by this spring which tends to hold pin 9$^b$ in register with arm 5$^b$. This produces a very efficient and inexpensive drive for the fan.

Rotor end member 25 is secured to gear 19 and rotor 6 by rivets 6$^a$, 6$^a$, and the unit thus formed is rotatively mounted on the shaft 5 and is yieldingly driven through torsion springs 26—27. 25 is provided with arms 25$^a$, 25$^b$, the former having an opening in it through which the end of pawl member 29 extends and so proportioned as to move freely diametrically by its own weight. 25$^b$ projects for engagement with the ends 26$^b$, 27$^b$ of springs 26—27 on one side and top end of arm 30$^c$ which is mounted for free movement on shaft 5. Arm 30 has projections 30$^a$, 30$^b$ for engagement with ends 26$^a$, 27$^a$ of the torsion springs 26, 27. Driving dog 35 is fixed to shaft 5 and drives the rotor unit through springs as mentioned. This dog has a projection 35$^a$ with which engages end 27$^b$ of spring 27, this end also extends for engagement with rotor arm 25$^b$. Both torsion springs exert pressure between their substantially parallel ends and tend to hold the parts in position as shown in Fig. 4.

Pin 28 is fixed in shaft 5 and upon rotation engages cam face 29$^a$ of pawl member 29 and moves it out of engagement with stop 36 which is secured to base 1, as shown in Figs. 10 and 11 as about to take place, and releases the rotor unit for rapid movement in the direction of rotation by both springs which have been strained by this movement of shaft 5 and dog 35. This is followed by a recoil which is absorbed by spring 27 alone, as shown in Figs. 12 and 13, (end 27$^a$ continues to rest on projection 30$^a$ while end 27$^b$ contacts arm 25$^b$) which is forcing the parts to normal, except that pawl member 29, under the influence of centrifugal force prevents contact between 29$^b$ and 36, thereby allowing continuous and free rotation, until the speed falls below a predetermined degree.

As the speed increases automatic timing begins through weight W exerting force through links 37, 38 to dog 35 and arm 30 which strains spring 27 by spreading arm 30 from dog 35 as shown in Figs. 14 and 15. The rotor and the ignition timing device, operated therewith, are forced to follow arm 30 by spring 26 which continuously holds arm 27$^b$ in contact with arm 30 while the device is functioning for timing. This action results in the angular position of the driven members being relatively advanced to the driving member.

As the impulse mechanism functions, a recoil or impact of the rotor unit is delivered against arm 30 and spring end 27$^a$ as explained above, the other end 27$^b$ of spring 27 engages with lug 35$^a$ of dog 35 and thereby effectively absorbs the blow and returns the parts to normal position and prevents damage to the parts. To eliminate undue impedance and to prevent the consequent overrunning during impulsing operations from disturbing the links 37, 38 and weight W, an annular slot 37$^A$ is provided in link 37 so that pivot 39 can find an uninterrupted path.

The impulse starter mechanism can be used independently of the automatic advance mechanism by removing the links 37, 38, weight W and spring 27. Also, the automatic advance mechanism can be used without the impulse starter feature by eliminating the pawl member 29 or by dispensing with the pawl member 29, spring 26 and attaching the arm 30 to the rotor's arm 25$^B$, as shown in Fig. 6. It will be noted in this modified structure (Fig. 6) that the top end of arm 30 is placed in slot 25$^c$ of arm 25$^b$ so that the rotor unit will be forced to follow the movements of arm 30.

Obviously, many changes in the details of construction or proportioning of the parts can be made without departing from the spirit of my invention and I do not limit myself to any particular form or arrangement of the parts.

What I claim as new is:—

1. In a combined impulse starter and automatic timing device for an electric current generator comprising a rotary driven member and a rotary driving member, adapted to have a limited turning movement in relation to the driven member, flexible means for connecting said members and means for straining and releasing said flexible means so as to cause a relatively rapid rate of movement of the driven member for a part of a revolution when operated at low speeds and means for straining said flexible means to arcuately change the relative position of said driven member to the driving member when the device is operated at relatively high speeds.

2. In a combined impulse starter and automatic timing device for an electric current generator comprising a driven member and a driving member, adapted to have a limited turning movement in relation to the driven member, flexible means for connecting said members and means for straining and releasing said flexible means so as to cause a relatively rapid rate of movement of the driven member for a part of a revolution when operated at low speeds and means for straining said flexible means when operated at relatively high speeds to shift the driven member about its axis relative to the driving member in a direction corresponding to the direction of the movement of the driving member.

3. The combination of an electric generator and an impulse starter provided with a rotor loosely mounted on a shaft carried in bearings adjacent its ends and consisting of parts of said impulse starter, flexible means located between said bearings for driving said rotor by said shaft.

4. The combination of an electric ignition generator, equipped with an impulse starter, provided with a shaft and a rotor loosely mounted on same, a spring of said impulse starter arranged for causing rotation of said rotor and a pair of lugs for limiting the action of the spring in both directions.

5. In combination with a combined electrical ignition device, of a combined impulser and a timing device, comprising a rotary driving member and a rotary driven member, adapted to have a limited turning movement in relation to the driving member, a flexible device interposed between said members, means for imparting intermittent mechanical pressure through said flexible device to said driven member when operated at low speed and means for applying continuous pressure through said flexible device to said driven member to change the annular relation between said members, when operated at relatively high speed.

6. In combination with a combined electrical ignition device, of a combined impulser and timing device, comprising a rotary driving member and a rotary driven member, adapted to have a limited turning movement in relation to the driving member, a flexible device interposed between said members, means for imparting intermittent accelerated movement through said flexible device in both directions, to said driven member when operated at low speed and means for applying continuous pressure through said flexible device to said driven member to change the annular relation between said members when operated at relatively higher speed.

7. In combination with a combined electrical ignition device, of a combined impulser and a timing device, comprising a rotary driving member and a rotary driven member, adapted to have a limited turning movement in relation to the driving member, a flexible device interposed between said members, means for imparting intermittent accelerated movement through said flexible device to said driven member when operated at low speed and means for applying continuous pressure through said flexible device to said driven member when operated at relatively higher speed to vary the timing of the igniting and generating cycle in relation to the driving member.

8. In combination with a combined electrical ignition device, of a combined impulser and a timing device, comprising a rotary driving member and a rotary driven member, adapted to have a limited turning movement in relation to the driving member, a flexible device interposed between said members, means for imparting intermittent accelerated movement through said flexible device to said driven member to effect ignition when operated at low speed and automatic means for applying continuous pressure through said flexible device to said driven member to change the annular relation between said members, when operated at relatively higher speed.

9. In an impulse drive mechanism, the combination of a rotary driven member, a rotary driving member adapted to have a limited turning movement in relation to the driven member, said driven and driving members being connected through a spring of said impulse drive mechanism and cooperating means arranged for causing an accelerated rotation of the driven member in relation to the driving member when operated at low speeds, also for causing a rotation of the driven member in synchronism with the driving member when driven at a higher constant speed, also for causing continuous rotation of the driven member at arcuately varying positions relative to the driving member when driven at varying speed.

10. In an impulse drive mechanism, the combination of a rotary driven member, a rotary driving member adapted to have a limited turning movement in relation to the driven member, means for intermittently stopping and releasing the driven member, a plurality of springs arranged between the driving and driven members, and abutments cooperatively related to the springs and said driving and driven members in such a manner that when relative rotational movement occurs between the driving and driven members in one direction force is transmitted from one of said members to the other through all of the springs and when such relative movement occurs in the opposite direction force is transmitted from one member to the other through only part of said springs.

11. In an impulse drive mechanism, the combination of a rotary driven member, a rotary driving member adapted to have a limited turning movement in relation to the driven member, means for intermittently stopping and releasing the driven member, two springs arranged in operative relation between the driving and driven members and abutments cooperatively related to the spring and said driven members in such manner that when relative rotational movement occurs between the driving and driven members in one direction force is transmitted from one of said members to the other through both springs and when such relative movement occurs in the opposite direction force is transmitted from one member to the other through one only of said springs.

12. In an impulse drive mechanism, the combination of a rotary driven member, a rotary driving member adapted to have a limited turning movement in relation to the driven member, means for intermittently stopping and releasing the driven member, a plurality of springs similar to each other and arranged between the driving and driven members, and abutments co-operatively related to the springs and said driving and driven members in such manner that when relative rotational movement occurs between the driving and driven members in one direction force is transmitted from one of said members to the other through all of the springs and when such relative movement occurs in the opposite direction force is transmitted from one of said members to the other through only part of said springs.

13. In an impulse drive mechanism, the combination of a rotary driven member, a rotary driving member adapted to have a limited turning movement in relation to the driven member, means for intermittently stopping and releasing the driven member, a plurality of torsion springs disposed between the driving and driven members, and abutments cooperatively related to the springs and said driving and driven members in such manner that when relative rotational movement occurs between the driving and driven members in one direction force is transmitted from one of said members to the other through all of the springs and when such relative movement occurs in the opposite direction force is transmitted from one of said members to the other through only part of said springs.

14. In an impulse drive mechanism for ignition generators, the combination of a driving shaft, a driven member, a driving arm fast with the driving shaft engaging an impelling flexible device carried on the shaft, a pressure transmitting member loosely journaled on the driving shaft and having a radially projecting arm engaging the impelling flexible device, locking mechanism constructed and arranged to lock the driven shaft against rotation while the driving shaft is rotating and thereby stress the flexible device, and releasing mechanism for the locking mechanism.

15. In an electric current generator equipped with a shaftless rotor and a driving device adapted to be interposed between a driving member and the generator rotor, an impulse starter adapted to become inoperative above a predetermined angular velocity and spark advancing mechanism responsive to the speed of said driving member.

16. In an electric current generator driving device adapted to be interposed between a driving member and the shaftless generator rotor, spark advancing mechanism responsive to the speed of said driving member, and an impulse starter adapted to become inoperative above a predetermined angular velocity interposed between said mechanism and the rotor of the generator.

In testimony whereof, I have hereunto set my hand this 1st day of June 1921.

JOHN LEWIS MILTON.